(12) United States Patent
Rousseau et al.

(10) Patent No.: US 6,176,203 B1
(45) Date of Patent: Jan. 23, 2001

(54) COW TRAINING DEVICE FOR COW STALLS

(75) Inventors: Victor Rousseau, Ste. Monique; Stéphane Desjardins, Nicolette; Léo Rousseau, Ste. Monique, all of (CA)

(73) Assignee: Rovibec Inc., Ste-Monique (CA)

( * ) Notice: Under 35 U.S.C. 154(b), the term of this patent shall be extended for 0 days.

(21) Appl. No.: 09/327,192

(22) Filed: Jun. 7, 1999

(51) Int. Cl.[7] .................................................. A01K 15/00
(52) U.S. Cl. ........................ 119/517; 119/518; 119/712
(58) Field of Search ................................. 119/517, 516, 119/518, 416, 712; 231/1

(56) References Cited

U.S. PATENT DOCUMENTS

| | | | |
|---|---|---|---|
| 535,860 | * 4/1895 | Rickerd | 231/1 |
| 1,503,039 | 7/1924 | Franklin . | |
| 1,512,610 | 10/1924 | Kolb . | |
| 1,746,770 | * 2/1930 | Jost | 119/517 |
| 2,428,875 | * 10/1947 | Hantz | 119/517 |
| 2,853,052 | * 9/1958 | Pearson | 119/517 |
| 3,043,266 | * 7/1962 | Olscheske | 119/517 |
| 3,370,570 | * 2/1968 | Treangen | 119/517 |
| 3,572,294 | * 3/1971 | Baker | 119/517 |
| 3,685,492 | 8/1972 | Baker . | |
| 4,556,014 | * 12/1985 | Huntsman et al. | 231/1 |
| 4,805,558 | * 2/1989 | Lehmann | 119/712 |
| 4,967,693 | 11/1990 | Prue . | |
| 5,003,926 | 4/1991 | Bratrud . | |

FOREIGN PATENT DOCUMENTS

| | | |
|---|---|---|
| 42626 | 9/1912 | (CA) . |
| 622594 | 6/1961 | (CA) . |

* cited by examiner

Primary Examiner—Peter M. Poon
Assistant Examiner—Judith A. Nelson
(74) Attorney, Agent, or Firm—François Martineau

(57) ABSTRACT

The cow training device has a bracket attached to the front cross-stanchion of the cow stall, over the neck of the cow. The bracket holds a rear pivotable arm, which has an outer free end adapted to be located spacedly over and proximate the cow's back. The bracket also holds a short selectively powered frontward rotatable whip, linked to a switch which is activated only if the rear arm is upwardly pivoted. If the cow is located at the front portion of its stall and it wants to evacuate, it will arch its back, which will come into upward abutment with the arm outer free end and upwardly pivot the arm. The switch will then be activated, and power will be supplied to the whip which will rotate to sting the cow's neck. To escape this treatment, the cow will normally back up in its stall reactively to position its hind portion over the rear stall gutter. Its arched back will then not abut on the arm outer free end, and the whip will stop rotating, thus relieving the cow of this whipping treatment. Thus, the cow is trained to back up in the stall before evacuating, to prevent the stall floor from being littered.

12 Claims, 3 Drawing Sheets

COW TRAINING DEVICE FOR COW STALLS

FIELD OF THE INVENTION

The present invention relates to devices for positioning cows in cow stalls, and more particularly to a device for training the cow to position itself correctly for preventing the cow from littering its stall floor.

BACKGROUND OF THE INVENTION

It is known to provide devices for preventing a cow from littering its stall floor with excrements. For this purpose, rear manure pits or gutters are provided at the rear end of the cow stall, wherein the cow is to evacuate, the stall floor thus remaining free of cow excrements. This littering prevention is especially desirable in the dairy industry, for the dug of the cow to remain clean and free of bacterial contamination; if the stall floor is littered with excrements, the dug of the cow is likely to become infected since the cow will eventually lie down and come in full contact with its underside with the stall floor.

A device to prevent the cow from littering its stall floor is shown in U.S. Pat. No. 4,967,693 issued in 1990 to Louis A. Prue. Prue discloses a transverse bar to be positioned spacedly and proximately over the back of the cow, the bar being attached by means of three intermediate serially-connected rods to a fixed post of the cow stall. By selectively adjusting the angular relationship between each intermediate rod, the bar can be fixedly positioned over the back of the cow at a suitable location, so that the transverse bar prevent the cow from arching its back. Indeed, since the cow needs to arch its back when evacuating, preventing the cow from arching its back effectively prevents the cow from evacuating at the position where the transverse bar prevents back arching.

In use, Prue teaches that the cow in need to evacuate will move backwards until its back clears the overhanging transverse bar, the hind portion of the cow then being positioned over the gutter, where the cow can evacuate without littering its stall floor. However, the reality is often different: the back of the cow becomes arched at the most of several inches, and thus the transverse bar must be positioned very precisely for it to be operative. The cow may thus arch its back into abutment with the transverse bar, and still be able to evacuate.

OBJECTS OF THE INVENTION

The gist of this invention to provide a device for training a cow to position its hind portion over the stall rear manure pit when it desires to evacuate.

SUMMARY OF THE INVENTION

The present invention relates to devices for positioning cows in cow stalls, and more particularly to a device for training the cow to position itself correctly for preventing the cow from littering its stall floor.

The invention more particularly relates to a cow training device for attachment to a fixed cow stall frame of the type preventing the cow from moving beyond a frontmost position, the stall of the type having a coextensive rear gutter, said training device comprising:

a bracket member for fixedly attaching said cow training device to the stall frame;

an arm member pivotally mounted to said bracket member and having an outer free end portion pivotable about said bracket member, said arm member being continuously biased towards a lower limit position in which said arm member outer free end portion is destined to be located spacedly over and in close proximity to the back of the cow, rearwardly of its shoulders and frontwardly of its thighs;

a selectively powered rotatable member carried by said bracket member and a whip fixed to said rotatable member, said whip destined to extend at least to the cow's body frontwardly of said arm member outer free end portion;

a power supply circuit including a switch linked to said whip and releasably interconnecting said arm member and said bracket member so as to allow power to be supplied to said selectively powered rotatable whip only responsively to said arm member being pivotally raised away from said lower limit position;

wherein upon the cow arching its back when it wants to evacuate and when its hind portion is located frontwardly of the stall rear gutter, its back will upwardly abut against said arm member outer free end portion to upwardly pivot said arm member away from said lower limit position, thereby activating said switch to consequently bring said whip into rotation for repetitively hitting the cow; and wherein the position of said arm member outer free end portion in the cow stall allows the cow to arch its back without abutting against said arm member outer free end portion if the cow's hind portion is located over the stall rear gutter, the cow thus being trained to escape whip pain by moving rearwardly in the stall to position its hind portion over the stall rear gutter before it is allowed to evacuate unhindered.

Preferably, said arm member is biased towards said lower limit position under its own weight, and is prevented from further downward movement by an abutment against said bracket member.

Preferably, said arm member outer free end portion is provided with a transverse rod destined to extend transversely and horizontally in the cow stall, for providing a wide abutment surface for the cow's back.

Preferably, said arm member comprises a first connector bar pivotally attached to said bracket member and a second outer bar fixedly attached to said connector bar in a selectively adjustable fashion, to allow selective adjustment of the angular relationship between said connector and outer bars.

Preferably, said arm member includes positional and length adjustment devices which allow selective positional adjustment of said arm member outer free end portion.

Preferably, said whip is an elongated plastic wire connected at an inner end thereof to said rotatable member.

Preferably, the fixed position of said whip can be angularly selectively adjusted.

Preferably, said switch is located in a casing comprising a first half portion attached to said bracket member and a second half portion attached to said arm member, with said first and second half portions of said casing being pivotable relative to each other and thus allowing pivotal displacement of said arm member relative to said bracket member, said casing forming an enclosure when said arm member is in said lower limit position so as to cover said switch member, and said switch member being activated and released upon said arm member and concurrently said casing second half portion being pivoted away from said casing first half portion, with said switch being attached to either one of said casing first and second half portions and engaging the other one of said casing first and second half portions when said arm member is in said lower limit position.

The present invention also relates to a cow training device for attachment to a fixed cow stall frame of the type preventing the cow from moving beyond a frontmost position, the stall of the type having a coextensive rear gutter, said training device comprising:

a bracket member for attaching said device to the cow stall frame;

an arm member mounted to said bracket member and movable relative to said bracket member, said arm member having an outer free end portion and being continuously biased towards a lower limit position in which said outer free end portion is located spacedly over and proximate the cow's back, between the cow's shoulders and thighs;

a rotatable member carried by said bracket member and a whip fixed to said rotatable member, said whip destined to extend at least to the cow's body frontwardly of said arm member outer free end portion;

a power supply circuit including a switch activated under upward movement of said arm member outer free end portion away from said lower limit position for supplying power to said whip upon said arm member being raised away from said lower limit position;

wherein said arm member outer free end portion is positioned so that if the cow archs its back to evacuate and its hind portion is located frontwardly of the stall rear gutter, its back will come into upward abutment with said arm member outer free end portion to upwardly move said arm member away from said lower limit position, said switch then being activated and power then being supplied to said whip which will rotate to sting the cow; and wherein if the cow backs up in its stall to position its hind portion over the rear stall gutter, then its arched back will not abut on said arm member outer free end portion, and said whip will not be rotated, the cow thus being trained to back up in the stall to evacuate.

The present invention further relates to a cow positioning device for use on the open frame of a cow stall, comprising:

a sensor member, to be mounted to the cow stall open frame, and sensitive to small variations in postures of the cow;

a cow skin pressure cue means, to be mounted to the cow stall open frame in register with the cow, said skin pressure cue means being noticeable by the cow and being of sufficient intensity as to bias the cow to bestride within the cow stall;

a power member, operatively connected to said cue means for releasably actuating same; and an on/off switch network, operatively interconnecting said sensor member and said power member for command and control of said power member between an inoperative cue means condition, responsively to proper cow posture parameters detected by said sensor member, and an operative cue means condition, responsively to improper cow posture parameters detected by said sensor member.

Preferably, said cue means further includes sound cue means noticeable by the cow and cooperating with said skin pressure cue means in biasing the cow to bestride within the cow stall.

Preferably, said skin pressure and sound cue means is a rotatable whip member, said whip member having a free end portion and being so positioned that said free end portion thereof is destined to come in repeated physical engagement with the cow skin upon rotation thereof.

DETAILED DESCRIPTION OF THE EMBODIMENT

Figure 1:
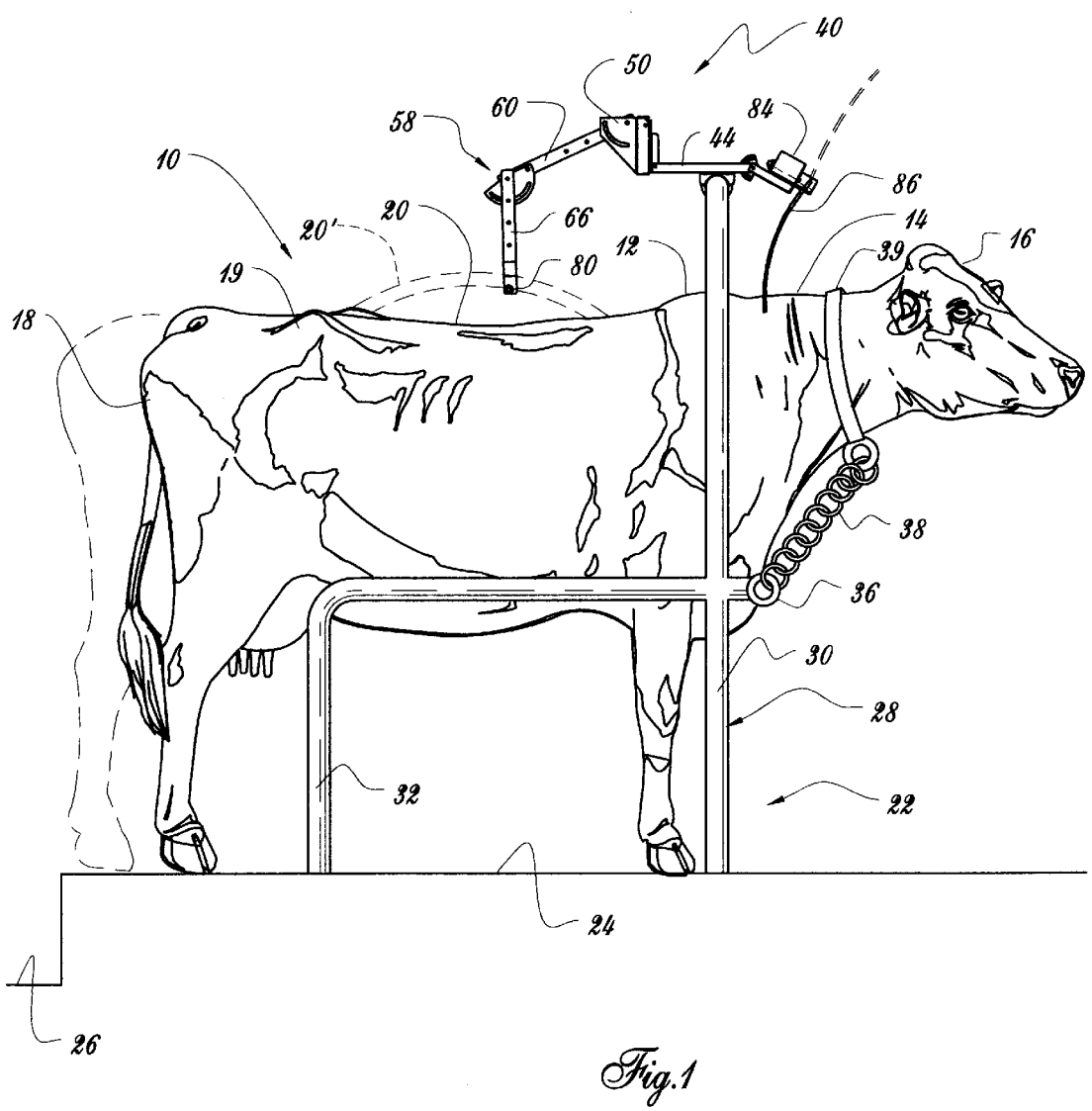
FIG. 1 is a side elevation of a standing cow shown in full lines in its frontmost feeding position in its cow stall, and in its rearward manure overhanging defecating position in dotted lines, with the cow-positioning device according to the invention being installed on the stall frame, the position of the arched cow back being further suggested in dotted lines in the cow frontmost feeding position.

FIG. 1 shows a cow 10 having shoulders 12, a neck 14, a head 16, a hind portion 18, thighs 19 and a back 20. The cow 10 is standing in a conventional cow stall 22 having a floor 24 and a rear gutter 26 forming a rearward extension of floor 24, the rear gutter 26 for receiving and collecting the cow's excrements when it evacuates, as known in the art. Stall 22 further comprises a frame 28 which prevents the cow from moving out of its stall 22, the frame including upright laterally spaced-apart support posts 30 (with only one post 30 being shown, the other one being concealed in FIG. 1), a pair of laterally spaced-apart side rails 32 (with one side rail being concealed in FIG. 1) and a cross-stanchion 34 (FIGS. 2 and 3) linking the upper ends of posts 30. Frame 28 further comprises a frontmost cross-bar stopper 36 located at such a height to prevent the cow from moving beyond a frontmost position shown in FIG. 1. A chain 38 or other tying element is attached to the frame cross-bar 36 and to a collar 39 on the cow's neck 14, to prevent the cow from stepping rearwardly out of its stall.

A cow training device 40 according to the invention is installed in stall 22. As shown more particularly in FIGS. 2 and 3, training device 40 has a bracket member 42 for fixedly attaching training device 40 to the stall frame 28, and more particularly to cross-stanchion 34 which, as suggested in FIG. 1, is generally located spacedly well over the shoulders 12 of cow 10. Bracket 42 comprises an L-shaped support 44 extending parallel to stall 22 on one side and the other of cross-stanchion 34, and having an upwardly-projecting first end portion 44a extending rearwardly into stall 22, and a straight frontwardly extending second end portion 44b opposite first end portion 44a. Support 44 is fixed to cross-stanchion 34 by means of a U-shaped tie-rod 46, with support 44 being provided with a number of aligned holes 47 therein for engagement of tie-rod 46 in a selected pair of holes 47, for adjustable positioning of support 44 onto cross-stanchion 34.

The first half portion 48a of a casing generally referred to with numeral 48, is fixedly attached to the upright support first end portion 44a and holds therein a pressure switch 49. Casing 48 further comprises a second half portion 48b which is pivotally attached at its upper end to the upper end of the casing first half portion 48a so as to allow casing second half 48b to pivot from a closed position (FIGS. 1 and 2), in which casing 48 forms an enclosure and in which casing second half 48b engages pressure switch 49, to an opened position (not shown), in which the casing second half 48b releases and concurrently activates pressure switch 49, as will be described hereinafter. Casing second half 48b is provided with a pair of parallel plates 50, 52 rearwardly projecting in stall 22 and having registering arcuate slots 54, 56 therein.

Training device 40 further comprises an arm member generally referred to with numeral 58, which comprises a first connector bar 60 attached between plates 50, 52 pivotally about a first bolt 62 and further attached with a second movable bolt 64 slidable in arcuate slots 54, 56, for allowing fixed positional angular adjustment of connector bar 60 relative to casing second half 48b. Arm member 58 further comprises a second outer bar 66 attached to first connector bar 60 pivotally about a first bolt 68 and further attached with a second movable bolt 70 and slidable in the arcuate slot 74 of an intermediate half-moon plate 72. Thus, fixed positional angular adjustment of outer bar 66 relative to connector bar 60 cart be accomplished. As shown, wing nuts 76, 78 are provided to cooperate respectively with movable bolts 64 and 70, to allow manual positional angular adjustment of connector and outer bars 60, 66, and to allow manual releasable fixed attachment of bars 60, 66 once this adjustment is accomplished. Arm member 58 has an outer free end portion 80, on outer bar 66, which carries a transverse rod 82 destined to extend transversely and horizontally in the cow stall 22, for providing a wide abutment surface for the cow's back 20, as will be explained hereinafter.

An electric motor 84 is mounted at the support second end 44b, motor 84 includes a rotatable shaft 85 to the free end of which is attached a radially-extending whip 86 in the form of an elongated plastic wire. A crescent plate 88 provided with an arcuate slot 90 allows fixed positional angular adjustment of motor 84 through cooperative engagement of a bolt 89 and wing nut 89a.

Figure 3:
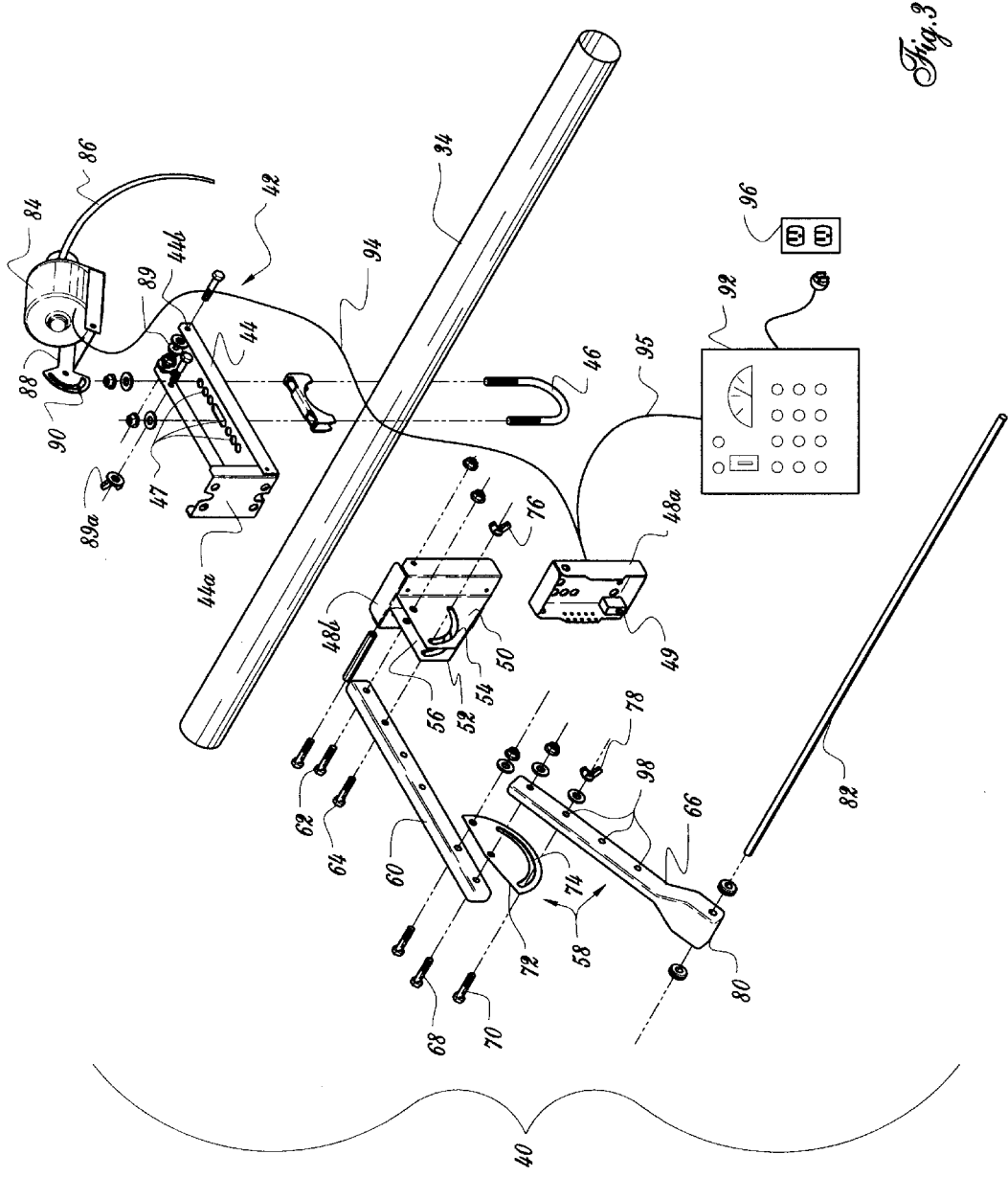
FIG. 3 is an exploded perspective view of the cow positioning device of FIG. 2, further schematically showing the power supply circuit of the cow training device.

Switch 49 is part of an electric power supply circuit and is linked to motor 84 and to a control panel 92 by means of wires 94, 95 schematically shown in FIG. 3. Control panel 92 is connected to a power supply 96. A single control panel 92 is preferably used to control a number of cow training devices each installed in a respective cow stall, for allowing selective control over training devices 40.

In use, as shown in FIG. 1, training device 40 is to be installed on cross-stanchion 34 and its position adjusted to fit the particular stall 22 and to correctly position the arm member outer free end portion 80 spacedly over and in close proximity to the back 20 of the cow, rearwardly of its shoulders 12 and frontwardly of its thighs 19. The positional adjustment of training device 40 is accomplished by adjustably installing support 44 on cross-stanchion 34, by selecting the angular relationship between connector bar 60 and casing second half 48b, between outer bar 66 and connector bar 60, and between whip 86 and support 44; and further by adjusting the effective length of outer bar 66 by selecting from a number of holes 98 therein, which pair will be engaged by bolts 68, 70. Further positional or length adjustment devices could also be envisioned, e.g. by providing telescopic connector and outer bars 60, 66.

Once the positional adjustment of training device 40 is completed, in addition to the arm member outer free end portion 80 being located spacedly over and proximate the cow's back 20, the whip 86 hangs so that its distal tip reaches the cow's neck 14. In this position, arm member 58 is biased by its own weight into a lower limit position, with casing second half 48b abutting against casing first half 48a to prevent further downward movement of arm member 58, and with casing second half 48b concurrently engaging pressure switch 49 to keep whip 86 in a disactivated mode. It is also noted that once all the positional adjustments of training device 40 are accomplished, all the bolts are tightened so as to form an integrally pivotable arm member 58, and more particularly the arm member outer free end portion 80 becomes pivotable about the fixed bracket member 42.

With this position of training device 40, if the cow stands at or near its frontmost position, i.e. frontwardly abutting against cross-bar 36, and archs its back as shown in 20' to evacuate, its back will upwardly abut against the arm member outer free end 80, and more particularly against transverse rod 82, to upwardly pivot arm member 58 and consequently pivot casing second half portion 48b into an opened position. Pressure switch 49, located inside casing 48, is then released from the abutting casing second half 48b and is consequently activated, to allow power to be supplied to motor 84 through the electric power supply circuit, including wires 95 and 94. Whip 86 will then rotate at high speed, with its free end portion 86a hitting the cow's neck 14 repetitively. The cow, being alerted both by touch and sound by feeling the whip 86 which stings its neck 14 and hearing it behind its ears, will want to escape this uncomfortable situation by trying to back up in an attempt to dodge the whip 86, or alternately will interrupt its evacuation activity and its back will thus resume a substantially straight horizontal condition, which will result in arm member 58 being vertically released to pivot back into its lower limit position. Pressure switch 49 will then be engaged once again, and whip 86 will stop its rotation, thus relieving pain to the mammal.

Thus, the cow will eventually develop a negative reinforcement loop Pavlovian conditioning such that, when the cow wants to evacuate and it is located so that its hind portion 18 is positioned frontwardly of the stall rear gutter 26, it gets pain by being whipped in the neck, while when it is located at the rear end of the stall, with its hind portion 18 over gutter 26, it does not get pain since the whip is inactive. Indeed, the outer free end portion 80 of arm member 58 is located in the cow stall so that cow 10 can arch its back without upwardly abutting on transverse rod 82 when the cow's hind portion 18 is located over the stall rear gutter 26. If the cow evacuates when its hind portion is located over the rear gutter 26, then the stall floor is not littered and likelihood of dug infection is greatly reduced. Hence, cow training is accomplished, to train the cow to back up towards the gutter 26 when it wants to evacuate. Typically such a conditioning takes usually a few days to occur, so that the whip motor 84 will remain substantially inactive afterwards.

A timer, e.g. located in control panel 92, is preferably provided with training device 40, the timer stopping the rotating whip after a determined amount of time, e.g. one minute. The timer is useful with particularly stubborn animals, for it prevents the cow from being whipped for long time periods, in case it does not understand that it has to move back in its stall to dodge the whip. A manual or automatic reset of the whip is also included on control panel 92, in addition to manual control of the power supply to whip 86.

It must be understood that the whip material or whipping speed thereof must be selected so as not to injure or wound the animal; at the most does it sting it, so that it may eventually understand its incorrect position in the stall. The small rotating plastic wire on the rough cow hide is indeed not sufficient to injure the animal. Basically, the slight pain sustained by the cow due to the whipping of its neck skin by the free end portion 86a of the elongated whip strip 86, is considered to constitute a cue means noticeable by the cow. This cow skin pressure cue means should be of sufficient intensity however as to bias the cow not only to move its head but truly to bestride backwardly within the cow stall, so that its rear legs come to overhang the aft manure pit 26 which is coextensive to the cow stall floor 24. Moreover, the whipping effect against the cow neck skin of the whip strip free end portion 86a may or may not generate a smacking sound. Such whip smacking sound could therefore further constitute a cue means noticeable by the cow that would reinforce the arc reflex conditioning of the cow generated by the direct physical engagement of the whip on the cow neck skin. Furthermore, it would not be outside the scope of this invention to envision that once provisional arc reflex conditioning of the cow has been acquired by the combined pressure skin and sound cue means of the rotating whip 86, within a week or so of use, the whip could be raised to completely clear the cow head and brought to bear against a sounding panel that would mimic the sound that would have been made if that whip had struck the cow skin. Therefore, in this latter embodiment, sound cue means alone could be considered sufficient to monitor the cow after initial conditioning with the combined skin pressure and sound cue means. Moreover, it has been experienced that even the slow learners do get the message after at most a few weeks, that they need to back up in their stall to evacuate, with the training device 40 of the invention. After the first few weeks of training, device 40 remains substantially permanently inactive in the stall, only as a reminder, i.e. that once in a while, the cow could temporarily forget to back up in its stall, and the whip will then be activated again, although such forgetfulness is unlikely in most animals.

Figure 2:
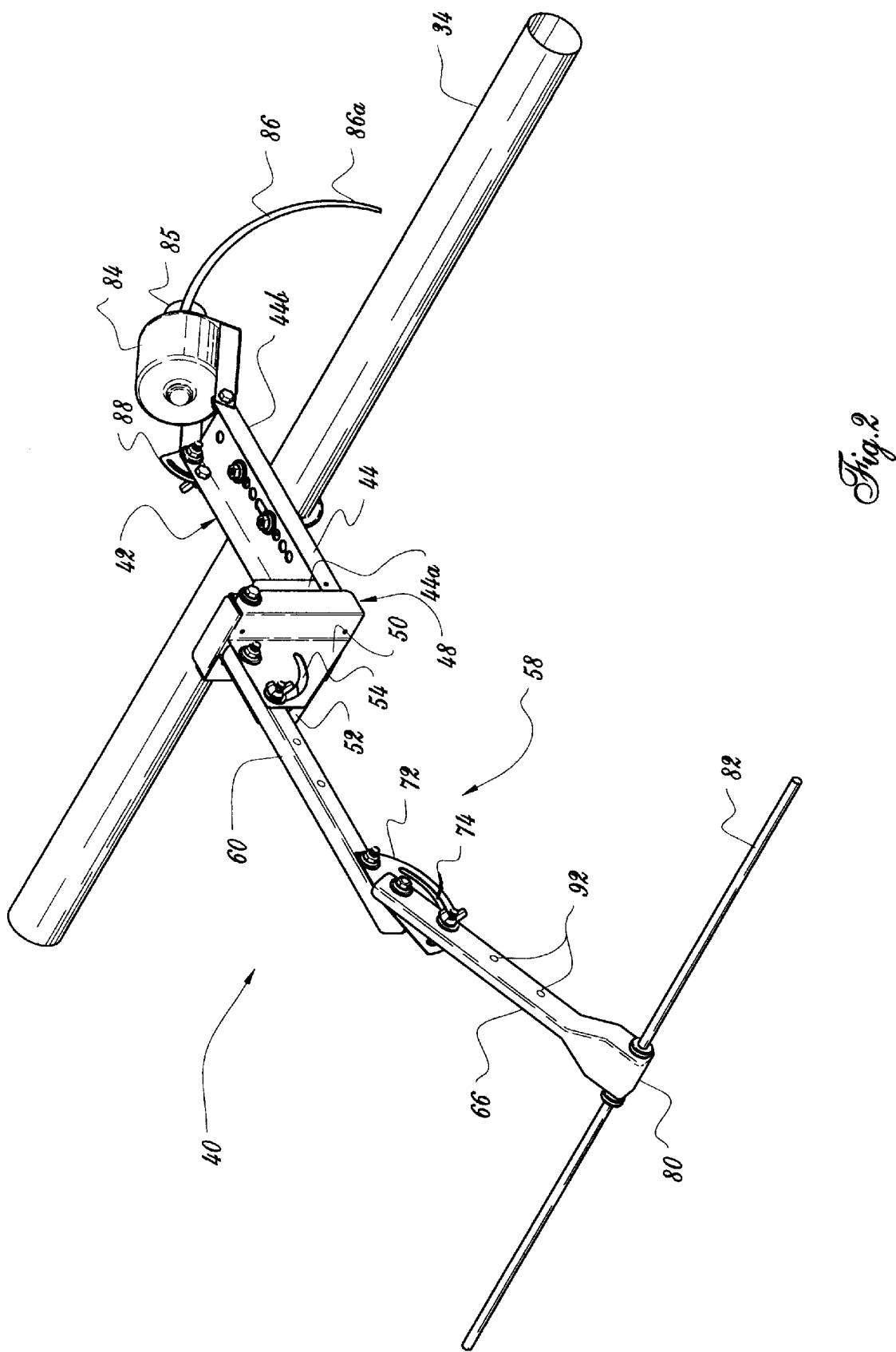
FIG. 2 is an enlarged perspective view of the cow positioning device of the invention, operatively installed on the horizontal cross-stanchion forming part of the cow stall frame.

As shown in FIGS. 1–3, the whip driving motor shaft 85 is preferably forwardly downwardly inclined, so that the whip slashing free end portion 86a be oriented towards the rear portion of the cow's neck and clearing the ears and eyes of the cow, to prevent accidental eye injury.

Thus, the cow training device according to the invention is advantageous in that its purpose is to prevent the cow from arching its back by training it to understand which position is acceptable, and which position is not. It does not physically restrain the cow, as with many prior art devices which include frames fixedly installed over the cow's back, and it does not injure the cow, since the whip only stings the cow.

Any modifications to the present invention, which do not deviate from the scope thereof, are considered to be included therein.

For example, it is envisioned that the bracket member could comprise two distinct portions, i.e. a first portion carrying the pivotable arm member and a second portion carrying the whip, both bracket portions then being installed separately on the cross-stanchion side by side, although with the whip still connected to the connector bar switch.

Also, the particular configuration of the arm member can vary according to design choices or to the particular needs of each individual cow, as will be obvious for someone skilled in the art. However, it has been found that the arm member configuration described in the present specification is particularly advantageous, since it allows simple yet versatile positional adjustments thereof, and also since the pivoting casing, remaining almost always in a closed position, protects the switch from any outer debris or accidental impact.

It is understood that the several positional adjustments of training device 40 include positioning casing 48 in at least a vertical or an upwardly and frontwardly inclined position, to prevent it from accidentally opening spontaneously under the gravity force. However, gravity compensating biasing devices, such as springs (not shown), could be used to allow casing 48 to be positioned in frontwardly and downwardly inclined positions, while still allowing casing second half 48b to be pivoted into an opened position upon the cow arching its back.

The training device 40 disclosed in the present specification is shown to be installed on the cross-stanchion of the cow stall, and thus the entire device 40 is located over the cow. However, it will be obvious for one skilled in the art to modify the configuration of the cow training device to fit cow stalls having different configurations. For example, the training device arm member could be installed on another portion of the stall than the cross-stanchion, e.g. on a side rail, as long as the arm member extends over the back of the cow so as to be movable responsive to the cow arching its back, to activate the whip in the manner disclosed hereinabove. The arm member could also be positioned over the cow's back and be linearly movable instead of pivotable.

We claim:

1. A cow training device for attachment to a fixed cow stall frame of the type preventing the cow from moving beyond a frontmost position, the stall of the type having a coextensive rear gutter, said training device comprising:

a bracket member for fixedly attaching said cow training device to the stall frame;

an arm member pivotally mounted to said bracket member and having an outer free end portion pivotable about said bracket member, said arm member being continuously biased towards a lower limit position in which said arm member outer free end portion is destined to be located spacedly over and in close proximity to the back of the cow, rearwardly of its shoulders and frontwardly of its thighs;

a selectively powered rotatable member carried by said bracket member and a whip fixed to said rotatable member, said whip destined to extend at least to the cow's body frontwardly of said arm member outer free end portion;

a power supply circuit including a switch linked to said whip and releasably interconnecting said arm member and said bracket member so as to allow power to be supplied to said selectively powered rotatable whip only responsively to said arm member being pivotally raised away from said lower limit position;

wherein upon the cow arching its back when it wants to evacuate and when its hind portion is located frontwardly of the stall rear gutter, its back will upwardly abut against said arm member outer free end portion to upwardly pivot said arm member away from said lower limit position, thereby activating said switch to consequently bring said whip into rotation for repetitively hitting the cow; and wherein the position of said arm member outer free end portion in the cow stall allows the cow to arch its back without abutting against said arm member outer free end portion if the cow's hind portion is located over the stall rear gutter, the cow thus being trained to escape whip pain by moving rearwardly in the stall to position its hind portion over the stall rear gutter before it is allowed to evacuate unhindered.

2. A cow training device as defined in claim 1, wherein said arm member is biased towards said lower limit position under its own weight, and is prevented from further downward movement by an abutment against said bracket member.

3. A cow training device as defined in claim 2, wherein said arm member outer free end portion is provided with a transverse rod destined to extend transversely and horizontally in the cow stall, for providing a wide abutment surface for the cow's back.

4. A cow training device as defined in claim 3, wherein said arm member comprises a first connector bar pivotally attached to said bracket member and a second outer bar fixedly attached to said connector bar in a selectively adjustable fashion, to allow selective adjustment of the angular relationship between said connector and outer bars.

5. A cow training device as defined in claim 1, wherein said arm member includes positional and length adjustment devices which allow selective positional adjustment of said arm member outer free end portion.

6. A cow training device as defined in claim 1, wherein said whip is an elongated plastic wire connected at an inner end thereof to said rotatable member.

7. A cow positioning device as defined in claim 1, wherein the fixed position of said whip can be angularly selectively adjusted.

8. A cow training device as defined in claim 1, wherein said switch is located in a casing comprising a first half portion attached to said bracket member and a second half portion attached to said arm member, with said first and second half portions of said casing being pivotable relative to each other and thus allowing pivotal displacement of said arm member relative to said bracket member, said casing forming an enclosure when said arm member is in said lower limit position so as to cover said switch member, and said switch member being activated and released upon said arm member and concurrently said casing second half portion being pivoted away from said casing first half portion, with said switch being attached to either one of said casing first and second half portions and engaging the other one of said casing first and second half portions when said arm member is in said lower limit position.

9. A cow training device for attachment to a fixed cow stall frame of the type preventing the cow from moving beyond a frontmost position, the stall of the type having a coextensive rear gutter, said training device comprising:

a bracket member for attaching said device to the cow stall frame;

an arm member mounted to said bracket member and movable relative to said bracket member, said arm member having an outer free end portion and being continuously biased towards a lower limit position in which said outer free end portion is located spacedly over and proximate the cow's back, between the cow's shoulders and thighs;

a rotatable member carried by said bracket member and a whip fixed to said rotatable member, said whip destined to extend at least to the cow's body frontwardly of said arm member outer free end portion;

a power supply circuit including a switch activated under upward movement of said arm member outer free end portion away from said lower limit position for supplying power to said whip upon said arm member being raised away from said lower limit position;

wherein said arm member outer free end portion is positioned so that if the cow archs its back to evacuate and its hind portion is located frontwardly of the stall rear gutter, its back will come into upward abutment with said arm member outer free end portion to upwardly move said arm member away from said lower limit position, said switch then being activated and power then being supplied to said whip which will rotate to sting the cow; and wherein if the cow backs up in its stall to position its hind portion over the rear stall gutter, then its arched back will not abut on said arm member outer free end portion, and said whip will not be rotated, the cow thus being trained to back up in the stall to evacuate.

10. A cow positioning device for use on the open frame of a cow stall, comprising:

a sensor member, to be mounted to the cow stall open frame, and sensitive to small variations in postures of the cow;

a cow skin pressure cue means, to be mounted to the cow stall open frame in register with the cow, said skin pressure cue means being noticeable by the cow and being of sufficient intensity as to bias the cow to bestride within the cow stall;

a power member, operatively connected to said cue means for releasably actuating same; and an on/off switch network, operatively interconnecting said sensor member and said power member for command and control of said power member between an inoperative cue means condition, responsively to proper cow posture parameters detected by said sensor member, and an operative cue means condition, responsively to improper cow posture parameters detected by said sensor member.

11. A cow positioning device as in claim 10, wherein said cue means further includes sound cue means noticeable by the cow and cooperating with said skin pressure cue means in biasing the cow to bestride within the cow stall.

12. A cow positioning device as in claim 11, wherein said skin pressure and sound cue means is a rotatable whip member, said whip member having a free end portion and being so positioned that said free end portion thereof is destined to come in repeated physical engagement with the cow skin upon rotation thereof.

* * * * *